United States Patent [19]

Gale

[11] 4,243,580

[45] Jan. 6, 1981

[54] ELASTOMERIC COPOLYETHER-ESTER/POLYOXYMETHYLENE

[75] Inventor: David M. Gale, Wilmington, Del.

[73] Assignee: E. I. Du Pont de Nemours and Company, Wilmington, Del.

[21] Appl. No.: 1,931

[22] Filed: Jan. 8, 1979

Related U.S. Application Data

[63] Continuation of Ser. No. 749,219, Dec. 10, 1976, abandoned.

[51] Int. Cl.$^3$ .................... C08K 5/34; C08L 67/06; C08K 5/20; C08K 5/18
[52] U.S. Cl. .................... 260/45.8 NT; 260/45.9 NC; 260/45.9 QB; 525/417
[58] Field of Search ............... 525/400, 417; 528/301; 260/45.8 NT, 45.9 NC, 45.9 QB

[56] References Cited

U.S. PATENT DOCUMENTS

| | | | |
|---|---|---|---|
| 3,595,937 | 7/1971 | Weissermel et al. | 525/400 |
| 3,651,014 | 3/1972 | Witsiepe | 528/301 |
| 3,907,926 | 9/1975 | Brown | 260/45.9 QB |
| 3,924,103 | 12/1975 | Furuishi et al. | 260/860 |
| 4,117,033 | 9/1978 | Gale | 528/301 |
| 4,169,867 | 10/1979 | Burg et al. | 525/417 |

FOREIGN PATENT DOCUMENTS 2449343  4/1976  Fed. Rep. of Germany .

*Primary Examiner*—V. P. Hoke

[57] ABSTRACT

An elastomeric copolyether-ester of improved combination of modulus and low temperature impact strength and flexibility is provided by the addition of about 5–45 percent by weight of an oxymethylene polymer. The copolyether-ester, having an inherent viscosity of at least 1, consists essentially of long-chain ester units derived from long-chain glycols and dicarboxylic acids and short-chain ester units derived from low molecular weight diols and dicarboxylic acids.

19 Claims, No Drawings

ELASTOMERIC COPOLYETHER-ESTER/POLYOXYMETHYLENE

CROSS-REFERENCE TO RELATED APPLICATION

This is a continuation of copending U.S. application Ser. No. 749,219, filed Dec. 10, 1976 and now abandoned.

BACKGROUND OF THE INVENTION

1. Field of the Invention

This invention relates to thermoplastic molding compositions based on copolyether-ester polymer blends and more particularly to blends of high molecular weight copolyether-esters with polyoxymethylene, to give blends of improved physical properties.

2. Relation to the Prior Art

Thermoplastic molding resins based on polyoxymethylene blends which contain at least 50% oxymethylene polymer are well known in the art, for example, U.S. Pat. Nos. 3,795,715; 3,696,171; 3,476,832; German Pat. No. 2,449,343; Can. Pat. No. 844,683. Applicant's copending application Ser. No. 749,220 now U.S. Pat. No. 4,117,033, discloses oxymethylene polymers which contain up to about 5% of low molecular weight copolyether-ester resins to give blends with improved melt processability. Also known are polyoxymethylene/aliphatic polyester block polymers (U.S. Pat. No. 3,580,973).

It is also known to modify the properties of polyester molding compositions based on linear saturated polyesters of aromatic dicarboxylic acids and optionally small amounts of aliphatic dicarboxylic acids, by addition of up to 25% of a polyacetal (U.S. Pat. No. 3,595,937). Brown et al. (U.S. Pat. No. 3,907,926) teach that copolyether-ester resin blends which contain between about 5 and 200 parts of poly(butylene terephthalate) per 100 parts of the copolyether-ester resin show improved physical properties, particularly high initial modulus and good low temperature impact strength and flexibility, compared with the copolyether-ester resins themselves. Blends of copolyether-ester resins with less than 50% polyoxymethylene have not previously been described.

SUMMARY OF THE INVENTION

According to the present invention there is provided an elastomeric molding composition comprising a mixture of:

(A) about 5–45 percent by weight of an oxymethylene polymer consisting essentially of about 95–100 percent by weight of oxymethylene units and 0 to about 5 percent by weight of oxyalkylene units of 2–8 adjacent carbon atoms in the main chain, said polymer having a number average molecular weight of about 1000–500,000; and (B) about 95–55 percent by weight of a copolyether-ester having an inherent viscosity of at least 1, as measured in m-cresol in 0.1 g/dl concentration at 30° C., said copolyether-ester consisting essentially of a multiplicity of recurring intralinear long-chain and short-chain ester units connected head-to-tail through ester linkages, said long-chain ester units having the formula:

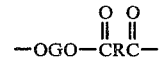

wherein
G is a divalent radical remaining after removal of terminal hydroxyl groups from a poly(alkylene oxide) glycol having a carbon-to-oxygen mole ratio of about 2–4.3 and a molecular weight of about 400–6000; and
R is a divalent radical remaining after removal of carboxyl groups from a dicarboxylic acid having a molecular weight less than about 300;

and said short-chain ester units having the formula:

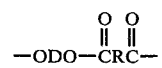

wherein
D is a divalent radical remaining after removal of hydroxyl groups from a low molecular weight diol having a molecular weight less than about 250; and
R is as defined above;

with the proviso that the short-chain ester units constitute about 15–95 percent by weight and the long-chain ester units constitute about 85–5 percent by weight of the copolyether-ester.

DETAILED DESCRIPTION OF THE INVENTION

Addition of 5–45%, preferably 10 to 40%, by weight of an oxymethylene polymer to a copolyether-ester resin gives resin blends which are useful as strong, stiff, elastomeric molding compositions with good low temperature toughness. Low temperature toughness is conveniently determined by measurement of impact strength at −40° C.

For certain applications, e.g., air brake tubing which is utilized in the automobile and trucking industries, elastomers need a high modulus to resist bursting at temperatures above freezing and outstanding low temperature impact strength and flexibility. Preferred for such applications are copolyether-ester/polyoxymethylene blends which utilize a copolyether-ester polymer with an inherent viscosity ($\eta$inh) of about 1.5 or above, and 20 to 40 weight percent of blended oxymethylene polymer.

Copolyether-ester polymers suitable for the invention may have a wide range of molecular weights, i.e., $\eta$inh about 1.0–2.5. Polymers which have an inherent viscosity of about 1.2 to 1.7 are preferred since many are commercially available.

The polyoxymethylene component (A) of the polymer blend is a polymer having chains of recurring oxymethylene units ($-CH_2O-$) or chains containing a predominance of the aforementioned units with the chain normally terminated at each end by a hydroxyl group, an alkyl group, hydroxyalkyl, or an ester group. Polyoxymethylenes having alkyl or hydroxyalkyl groups (ether linkages) on the ends of the polymer chain are base stable. It is preferred to employ stabilized end-capped polymers which contain acetate end groups.

In general, the oxymethylene polymer consists essentially of about 95–100 percent by weight of oxymethylene units and 0 to about 5 percent by weight of oxalkylene units of 2–8 adjacent carbon atoms in the main chain, preferably 2 adjacent carbon atoms. The polymers have a number average molecular weight of about 1000–500,000, preferably having an inherent viscosity of about 0.5–2.8 measured in hexafluoroisopropyl alcohol (HFIP) in 0.5 percent by weight concentration at 30° C., which corresponds to a number average molecular weight of about 5,000–100,000.

Homopolymers of formaldehyde or trioxane, or trioxane copolymers which preferably contain a linear structure are used as the oxymethylene component of the molding resin. Trioxane copolymers include copolymers of trioxane/cyclic ethers, cyclic acetals and/or linear polyacetals, which contain terminal primary alcohol groups. Suitable comonomers for trioxane are further described in U.S. Pat. No. 3,795,715. A preferred comonomer for copolymerization with trioxane is 1,3-dioxolane.

The homopolymers of formaldehyde or trioxane used according to the invention may be produced by known methods by catalytic polymerization of the monomers, as described, for example, in U.S. Pat. Nos. 2,768,994; 2,982,758; and 2,989,505. Other patents which describe these polymers and processes for their production include U.S. Pat. Nos. 2,734,889; 2,768,994; 2,828,286; 2,844,561; 2,848,437; 2,841,570; and 2,994,687.

The copolymers used according to the invention are produced by known methods by copolymerization of the monomers, as described, for example, in U.S. Pat. Nos. 3,027,352 and 3,076,786.

Stabilization of oxymethylene homopolymers and copolymers is described in U.S. Pat. Nos. 3,183,211; 3,103,499 and 3,219,623.

The high molecular weight copolyether-ester resin has an inherent viscosity of at least 1, preferably about 1–2.5 and most preferably about 1.2–1.7, measured in m-cresol in 0.1 g/dl concentration at 30° C. The copolyether-ester consists essentially of a multiplicity of recurring intralinear long-chain and short-chain ester units connected head-to-tail through ester linkages, with the long-chain ester units having the formula:

$$-OGO-\overset{O}{\underset{\|}{C}}R\overset{O}{\underset{\|}{C}}- \quad (a)$$

wherein
  G is a divalent radical remaining after removal of terminal hydroxyl groups from a poly(alkylene oxide) glycol having a carbon-to-oxygen mole ratio of about 2–4.3 and a molecular weight of about 400–6000; and
  R is a divalent radical remaining after removal of carboxyl groups from a dicarboxylic acid having a molecular weight less than about 300, preferably

The term "long-chain ester units" as applied to units in the copolyether-ester polymer component B of the polymer blend refers to the reaction product of a long-chain glycol with a dicarboxylic acid. Such "long-chain ester units", which are a repeating unit in the copolyether-ester used in this invention, correspond to formula (a) above. The long-chain glycols are polymeric glycols having terminal (or as nearly terminal as possible) hydroxyl groups and a molecular weight from about 400–6000. The long-chain glycols used to prepare the copolyether-esters of this invention are poly(alkylene oxide) glycols having a carbon-to-oxygen ratio of about 2.0–4.3 and preferably having the alkylene moiety of 2–8 carbon atoms.

Representative long-chain glycols are described in U.S. Pat. No. 3,907,926, and include poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The short-chain ester units in the copolyether-ester have the formula:

$$-ODO-\overset{O}{\underset{\|}{C}}R\overset{O}{\underset{\|}{C}}- \quad (b)$$

wherein
  D is a divalent radical remaining after removal of hydroxyl groups from a low molecular weight diol having a molecular weight less than about 250, and
  R is as defined above for (a).

The term "short-chain ester units" as applied to units in the polymer chain refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols which react to form short-chain ester units are aliphatic, cycloaliphatic, and aromatic dihydroxy compounds. Preferred are diols with 2–15 carbon atoms such as ethylene, propylene, tetramethylene, pentamethylene, 2,2-dimethyltrimethylene, hexamethylene, and decamethylene glycols, dihydroxycyclohexane, cyclohexanedimethanol, resorcinol, hydroquinone, 1,5-dihydroxynaphthalene, etc. More preferred are aliphatic diols containing 2–8 carbon atoms, especially $+CH_2+_n$ where n is 2–4. Included among the bis-phenols which can be used are bis(p-hydroxy)diphenyl, bis(p-hydroxyphenyl)methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives, provided, however, that the molecular weight requirement pertains to the diol only and not to its derivatives.

Dicarboxylic acids which are reacted with the foregoing long-chain glycols and low molecular weight diols to produce the copolyesters of this invention are also disclosed in U.S. Pat. No. 3,907,926, and include aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxylic groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer blends of this invention.

Aliphatic dicarboxylic acids, as the term is used herein, refers to carboxylic acids having two carboxyl groups, each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as $-O-$ or $-SO_2-$.

Representative aliphatic and cycloaliphatic acids which can be used for this invention are sebacic acid, 1,3-cyclohexanedicarboxylic acid, 1,4-cyclohexanedicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalenedicarboxylic acid, 4,4'-bicyclohexyldicarboxylic acid, decahydro-2,6-naphthalenedicarboxylic acid, 4,4'-methylenebis(cyclohexanecarboxylic acid), 3,4-furandicarboxylic acid, and 1,1-cyclobutanedicarboxylic acid. Preferred aliphatic acids are cyclohexanedicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, p-oxy(p-carboxyphenyl)benzoic acid, ethylene-bis(p-oxybenzoic acid), 1,5-naphthalenedicarboxylic acid, 2,6-naphthalenedicarboxylic acid, 2,7-naphthalenedicarboxylic acid, phenanthrenedicarboxylic acid, anthracenedicarboxylic acid, 4,4'-sulfonyldibenzoic acid, and $C_1-C_{12}$ alkyl and ring substitution derivatives thereof, such as halo, alkoxy and aryl derivatives. Hydroxyl acids such as p($\beta$-hydroxyethoxy)benzoic acid can also be used providing an aromatic dicarboxylic acid is also present.

Aromatic dicarboxylic acids are an especially preferred class for preparing the copolyether-ester polymers of this invention. Among the aromatic acids, those with 8-16 carbon atoms are preferred, particularly the phenylenedicarboxylic acids, i.e., phthalic, terephthalic and isophthalic acids and their dimethyl derivatives.

It is preferred that at least about 50% of the short segments are identical, and that the identical segments form a homopolymer in the fiber-forming molecular weight range (molecular weight >5000) having a melting point of at least 150° C. and preferably greater than 200° C. Polymer melting points are conveniently determined by differential scanning calorimetry.

The short-chain ester units will constitute about 15-95 weight percent of the copolyether-ester. The remainder of the copolyether-ester will be the long segments, ergo the long segment will comprise about 5-85 weight percent of the copolyether-ester. Copolyether-esters in which the short-chain units comprise 25-90 weight percent with 10-75 weight percent long-chain units are preferred. Particularly preferred are copolyether-esters which contain about 45-65 weight percent short-chain units.

With regard to the manufacture of the copolyether-esters, they may be made by a conventional ester interchange reaction followed by conversion of the low molecular weight prepolymer to a higher molecular weight copolyether-ester by a "polycondensation" process at reduced pressure. The manufacturing process is described in detail in U.S. Pat. No. 3,907,926, Columns 4-6, and this patent is hereby incorporated by reference. Preparative procedures employed for preparation of the copolyether-ester resins employed in the specific embodiments are described below.

Preferred copolyether-esters which are blended by the process of this invention are those prepared from dimethyl terephthalate, 1,4-butanediol and poly(tetramethylene oxide)glycol having a molecular weight of about 600-2000, poly(ethylene oxide) glycol having a molecular weight of about 600-1500, or poly(propylene oxide) glycol having a molecular weight of about 1000-2500. Optionally, a portion, preferably up to about 30 mole percent, of the dimethyl terephthalate in these polymers can be replaced by dimethyl phthalate or dimethyl isophthalate. The polymers based on poly(tetramethylene oxide) glycol are especially preferred because they are easily prepared, having overall superior physical properties, and are especially resistant to water. Most preferred are copolyether-esters containing 45-65% by weight of short-chain ester units derived from terephthalate and 1,4-butanediol.

The most preferred copolyether-ester compositions also contain 0.5 to 5 weight percent of an antioxidant, preferably 4,4'-bis($\alpha,\alpha$-dimethylbenzyl)diphenylamine, 1,3,5-tris(3,5-di-tert-butyl-4-hydroxyhydrocinnamoyl)-hexahydro-s-triazine or 1,6-bis[3-(3,5-di-tert-butyl-4-hydroxyphenyl)propionamido[hexane. Optionally they also may contain a stabilizer, e.g., 0.5 to 3.0 weight percent of amide linkages, preferably provided by a copolymer of polycaprolactam and polyhexamethylene adipamide, or terpolymer of polycaprolactam, polyhexamethylene adipamide, and polyhexamethylene sebacamide.

The antioxidant and the amide may be added at any time during the preparation of the copolyether-ester or following its preparation. Preferably an antioxidant should be present during the polycondensation aspect of the reaction in an amount of at least about 0.2 percent by weight based on the estimated yield of copolyether-ester product, preferably in an amount of 0.5 to 2.0 percent by weight. It is preferred that a suitable antioxidant be present at any point in the process where the poly(alkylene oxide) glycol is exposed to elevated temperatures, e.g., above about 100° C. The antioxidant, depending on its melting point, may be added as a solid, a molten liquid, or as a solution or dispersion in one or more of the reactants. In batch operations, it is conveniently added as a solid or as a solution or dispersion in the diol or the poly(alkylene oxide) glycol at the time of charging the reactor. In continuous operation, the antioxidant is most conveniently added as a solution or dispersion in the diol and/or glycol entering the process. The antioxidant may, or course, be introduced at later stages in the process and even after preparation of the copolyether-ester is complete. It is usually convenient to add the total amount of antioxidant desired in the finished copolyether-ester during its preparation; however, additional amounts of antioxidant can be added to the finished copolyether-ester by melt blending.

The resulting copolyether-ester may be blended by any of several techniques with the oxymethylene polymer. For best results in preparing the blends of this invention, the components must be thoroughly and uniformly blended, otherwise localized areas will differ in properties. The blend is produced by mixing the components and subsequently homogenizing. The mixing usually takes place at ambient temperatures, i.e., 20°–35° C., and the homogenizing takes place in any easily heated mixing apparatus, e.g., rollers, calenders, kneaders or extruders, at a temperature above the crystalline melting point of the oxymethylene polymer, i.e., at a temperature of 150°–260° C., preferably 170°–230° C. Necessarily, depending on the amount of short-chain segments present in the copolyether-ester, there will be a good deal of variation in the broad range; operating most efficiently within such temperature range will present no difficulty for one skilled in the art.

Alternatively, blending can be carried out by mixing the oxymethylene polymer with molten copolyether-ester at the conclusion of the polycondensation process.

The pressure utilized during blending may vary broadly, but in most instances ambient pressure is satisfactory. On occasion, higher pressures may be inherent due to the nature of the equipment in which blending is performed.

Solution blending may also be employed by use of a solvent common to the polymeric ingredients, e.g., chlorinated aromatics such as o-dichlorobenzene. Polymer recovery is achieved by solvent evaporation or by precipitation with a non-solvent.

The mixing or blending of the oxymethylene polymer and the copolyether-ester is preferably accomplished by means of extrusion blending. Suitable devices for the blending include single screw extruders, twin screw extruders, internal mixers such as the Banbury Mixer, heated rubber mills (electric or oil heat) or a Farrell continuous mixer. Injection molding equipment can be used to accomplish blending just prior to molding, but care must be taken to provide sufficient time and agitation to insure uniform blending prior to molding.

Provided that the final compositions are within the stated limits, one, or more than one, oxymethylene polymer may be blended with one, or more than one, copolyether-ester resin.

The molding resin blends may also contain additives, especially stabilizers and/or fillers as well as nucleating agents, antistatic agents, flame retardants, lubricants, plasticizers, pigments, dyes, optical brightening agents or mold-release agents, known in the art.

Antioxidants and stabilizers especially suited for the copolyether-ester component of the blend are described above. Conventional stabilizers for oxymethylene polymers, e.g., nylon oligomers, copolymers and terpolymers; and phenolic and aromatic amine-containing antioxidants may also be employed. The amounts of stabilizers employed are preferably less than 2 weight percent of each ingredient resin.

Suitable fillers include, for example, asbestos fibers, glass fibers, glass powder, graphite, carbon black, graphite metal powder, boron fibers, metal oxides, silicates, silica, carbonate, clay, alumina, etc. Polymeric additives which may be added include those that are melt-blended, e.g., ethylene/methacrylic acid copolymers, neutralized or unneutralized; ethylene/acrylic acid copolymers, neutralized or unneutralized; non-meltable polymeric fibrous additives such as aramid fibers, etc. The total amount of fillers and other additives is preferably less than 70 weight percent of the molding resin composition.

In computing the useful compositions of the molding resins, the oxymethylene polymers and copolyether-ester resins are considered to be free of fillers and other additives except for the oxidation and thermal stabilizers normally included in commercially available samples of the components.

The molding resin blends can be broken up mechanically, e.g., by chopping or grinding, to form a granulate, shavings, flakes or powder. Since they are thermoplastic, they can be worked by injection molding, extrusion, melt spinning or deep-drawing. The resulting blends can be utilized in elastomeric applications in general including pneumatic tubing and, as previously indicated, in air brake tubing.

EMBODIMENTS OF THE INVENTION

The following are illustrative examples of the invention in which all parts and percentages are by weight and all degrees are Celsius unless otherwise stated.

The following ASTM methods were employed in determining the properties of the polymer compositions prepared in the examples which follow:

| | |
|---|---|
| Stress/Strain Properties* including tensile at break ($T_B$) and percent elongation at break ($E_B$) | D638 |
| Flexural Modulus | D790 |
| Notched Izod Impact | D256 |
| Hardness, Shore D | D1484 |
| Gardner Impact | D2794 |

*Cross-head speed 2"/minute if not stated otherwise.

Inherent viscosities of the copolyether-ester resins were measured at 30° at a concentration of 0.1 g/dl in m-cresol.

The following catalyst was used in preparing copolyether-ester resins A–C of the examples:

Catalyst

To 425 parts of anhydrous 1,4-butanediol was added 23.32 parts of tetrabutyl titanate. The mixture was agitated at 50° for 2–3 hours until the small amounts of solids orginally present disappeared.

Copolyether-ester resins A–C were prepared using the following charge in an agitated flask fitted for distillation:

| | |
|---|---|
| Polytetramethyleneether glycol, number average molecular weight about 975 | 88.0 parts |
| 1,4-Butanediol | 73.0 parts |
| Dimethyl terephthalate (T) | 88.0 parts |
| Dimethyl isophthalate (if used) (I) | 24.7 parts |
| 1,6-Bis[3-(3,5-di-tert-butyl-4-hydroxyphenyl)-propionamido]hexane | 2.0 parts |

| -continued | |
|---|---|
| Catalyst | 4.0 parts |

A stainless steel stirrer with a paddle cut to conform with the internal radius of the flask was positioned about one-eight inch from the bottom of the flask and agitation was started. The flask was placed in an oil bath at 160°, agitated for five minutes, and then the catalyst was added. Methanol distilled from the reaction mixture as the temperature was slowly raised to 250° over a period of one hour. When the temperature reached 250°, the pressure was gradually reduced to 0.3 mm within 20 minutes. The polymerization mass was agitated at 250°/0.3 mm for about 35 minutes. The resulting molten product was scraped from the flask in a nitrogen (water and oxygen free) atmosphere and allowed to cool. The inherent viscosity of the product was measured. The inherent viscosities of the resins were varied by varying the polycondensation times.

The properties of the copolyether-ester resins A-C are summarized in Table I.

TABLE I

COPOLYETHER-ESTER RESINS

| Resin Designation | $\eta_{inh}$ | Shore D Hardness | Wt % Short Chain Ester Units | Dicarboxylic Acid (T/I) Ratio |
|---|---|---|---|---|
| A | 1.2 | 40 | 49 | 3.5 |
| B | 1.5 | 40 | 49 | 3.5 |
| C | 1.5 | 55 | 60 | All T |

60° under vacuum, and they were injection molded to provide samples suitable for physical testing.

Physical properties of this blend are tabulated in Table II, and they show the improvement in tensile properties and modulus of the blend compared with the copolyether-ester control A.

EXAMPLE 2

A polymer blend (20/80) of the acetate-capped polyoxymethylene polymer of Example 1 and copolyether-ester resin B was prepared as described in Example 1, and the physical properties of this blend are tabulated in Table II. The tensile properties and modulus of the blend are improved compared with Control B.

EXAMPLE 3

A polymer blend (20/73) of the acetate-capped polyoxymethylene polymer of Example 1 and copolyether-ester resin B was prepared as described in Example 1, and 7 parts of a partially neutralized methacrylic acid-/ethylene copolymer were included in the blend. The physical properties of this blend are tabulated in Table II, and they show the improved properties of the blend in the presence of a polymeric filler.

EXAMPLE 4

A polymer blend (30/70) of an oxymethylene copolymer (Celcon ® M-90) and copolyether-ester resin C, was prepared as described in Example 1, and the physical properties of this blend are tabulated in Table II. Improvement in flexural modulus compared with a control (resin C, Table III) is observed.

TABLE II

Polyoxymethylene/Copolyether-Ester Blends
Physical Properties of Blends

| Example | Copolyether-Ester Resin | Wt. Percent | $T_B$ kpsi | % $E_B$ | Flexural Modulus, kpsi | | | N.Izod Ft-lbs/in | | Tensile Stress (1"/min) psi at % E | | | | | |
|---|---|---|---|---|---|---|---|---|---|---|---|---|---|---|---|
| | | | | | 25° | 121° | −40° | 25° | −40° | 1 | 3 | 5 | 10 | 15 | 100 |
| 1 | A | 80 | 2.5[1] | >480 | 49.5 | 12.6 | 84.8 | No break | 2.3 | 108 | 360 | 788 | 930 | 1013 | — |
| 2 | B | 80 | 3.0[2] | >784 | 17.1 | 3.8 | 34.3 | No break | 10 | 130 | 352 | 514 | 758 | — | 1426 |
| 3 | B | 78[3] | 3.3[4] | >747 | 17.4 | 2.4 | 35.7 | No break | 7 | 135 | 371 | 552 | 832 | — | 1430 |
| 4 | C | 70 | 1.9[5] | >310 | 121 | — | — | 9 | — | — | — | — | — | — | — |
| Control A | A | 100 | — | — | 9 | 2.3 | 23 | — | 19 | 62 | 232 | 590 | 720 | 794 | — |
| Control B | B | 100 | — | — | 10.8 | 2.4 | 27 | — | 15 | 66 | 194 | 302 | 498 | — | 915 |

[1]Tensile strength at 480% E
[2]Tensile strength at 784% E
[3]Value not based on added ionomer resin
[4]Tensile strength at 747% E
[5]Tensile strength at 310% E

EXAMPLE 1

A 20/80 mixture of dry-blended pellets of acetate-capped polyoxymethylene polymer (MW 25,000–30,000) and copolyether-ester resin A was fed through a water-cooled hopper into a 28-mm twin screw extruder (Werner and Pfleiderer Corp.) to effect melt-blending of the mix. Typical extrusion conditions were as follows: screw speed, 150 revolutions/min; vacuum, 30 inches of Hg; hopper temperature, 105°; barrel temperatures, 162° (rear) to 187° (front of center); die temperature, 181°. The blended pellets were dried at

EXAMPLE 5

Various blends (10–40%) of an acetate-capped polyoxymethylene polymer (MW ∼60,000) with copolyether-ester resins B and C were prepared as described in Example 1, and the physical properties of the blends are tabulated in Table III. The improvement in stiffness and toughness with retention of good impact strength for the blends compared with the control polymers is noted.

TABLE III

Polyoxymethylene/Copolyether-Ester Blends

| Copolyether-Ester Resins | Wt. Percent | Yield Stress psi, 25° | Flexural Modulus kpsi, 25° | Gardner Impact in.-lbs., −40° | $T_B$, kpsi | % $E_B$ |
|---|---|---|---|---|---|---|
| B | 100 (control) | 1200 | 7.0 | >160 | — | — |
| B | 80 | 1500 | 44. | >160 | — | — |

TABLE III-continued

Polyoxymethylene/Copolyether-Ester Blends

| Copolyether-Ester Resins | Wt. Percent | Yield Stress psi, 25° | Flexural Modulus kpsi, 25° | Gardner Impact in.-lbs., −40° | $T_B$, kpsi | % $E_B$ |
|---|---|---|---|---|---|---|
| B | 70 | 2750 | — | >160 | — | — |
| B | 60 | 3800 | — | >160 | 3.7 | 210 |
| C | 100 (control) | 2500 | 30. | >160 | — | — |
| C | 90 | 2500 | 45. | >160 | — | — |
| C | 80 | 3500 | — | 158 | 6.0 | 430 |
| C | 75 | 3900 | — | 143 | — | — |
| C | 70 | 4100 | — | 152 | — | — |

What is claimed is:

1. An elastomeric molding composition comprising a mixture of:
   (A) about 10–40 percent by weight of an oxymethylene polymer consisting essentially of about 95–100 percent by weight of oxymethylene units and 0 to about 5 percent by weight of oxyalkylene units of 2–8 adjacent carbon atoms in the main chain, said polymer having a number average molecular weight of about 1000–500,000;
   (B) about 90–60 percent by weight of a copolyether-ester having an inherent viscosity of at least 1, as measured in m-cresol in 0.1 g/dl concentration at 30° C., said copolyether-ester consisting essentially of a multiplicity of recurring intralinear long-chain and short-chain ester units connected head-to-tail through ester linkages, said long-chain ester units having the formula:

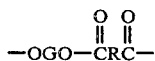

(a)

wherein
G is a divalent radical remaining after removal of terminal hydroxyl groups from a poly(alkylene oxide) glycol having a carbon-to-oxygen mole ratio of about 2–4.3 and a molecular weight of about 400–6000; and
R is a divalent radical remaining after removal of carboxyl groups from a dicarboxylic acid having a molecular weight less than about 300;
and said short-chain ester units having the formula:

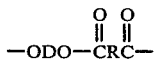

(b)

wherein
D is a divalent radical remaining after removal of hydroxyl groups from a low molecular weight diol having a molecular weight less than about 250; and
R is as defined above;
with the proviso that the short-chain ester units constitute about 15–95 percent by weight and the long-chain ester units constitute about 85–5 percent by weight of the copolyether-ester.

2. The composition of claim 1 wherein (1) the alkylene in poly(alkylene oxide) glycol is from 2–8 carbon atoms; (2) the diol is an aliphatic, cycloaliphatic or aromatic diol of 2–15 carbon atoms and (3) the dicarboxylic acid is an aliphatic, cycloaliphatic or aromatic dicarboxylic acid or an ester, acid halide or anhydride thereof.

3. The composition of claim 2 wherein the copolyether-ester inherent viscosity is about 1–2.5.

4. The composition of claim 3 wherein the short-chain ester units constitute about 25–90 percent by weight and the long-chain ester units constitute about 75–10 percent by weight of the copolyether-ester.

5. The composition of claim 4 wherein the oxymethylene polymer comprises about 20–40 percent by weight of the mixture.

6. The composition of claim 5 wherein the glycol is selected from the group consisting of poly(tetramethylene oxide) glycol, poly(ethylene oxide) glycol and poly(propylene oxide) glycol; the diol is selected from the group consisting of ethylene glycol and 1,4-butanediol and the dicarboxylic acid is selected from the group consisting of phthalic acid, terephthalic acid and isophthalic acid and their dimethyl derivatives.

7. The composition of claim 1 wherein the oxymethylene polymer is a homopolymer of formaldehyde end terminated with hydroxyl, alkyl, hydroxyalkyl or ester groups.

8. The composition of claim 7 wherein the oxymethylene polymer has a number average molecular weight of about 5,000–100,000.

9. The composition of claim 8 wherein (1) the alkylene in poly(alkylene oxide) glycol is from 2–8 carbon atoms; (2) the diol is an aliphatic, cycloaliphatic or aromatic diol of 2–15 carbon atoms and (3) the dicarboxylic acid is an aliphatic, cycloaliphatic or aromatic dicarboxylic acid or an ester, acid halide or anhydride thereof.

10. The composition of claim 9 wherein the copolyether-ester inherent viscosity is about 1–2.5 and the short-chain ester units constitute about 25–90 percent by weight and the long-chain ester units constitute about 75–10 percent by weight of the copolyether-ester.

11. A thermoplastic molding composition comprising a mixture of:
   (A) about 10–40 percent by weight of an oxymethylene homopolymer of formaldehyde end-capped with acetate groups and having a number average molecular weight of about 5,000–100,000; and
   (B) about 90–60 percent by weight of a copolyether-ester having an inherent viscosity of about 1–2.5, as measured in m-cresol in 0.1 g/dl concentration at 30° C., said copolyether-ester consisting essentially of a multiplicity of recurring intralinear long-chain and short-chain ester units connected head-to-tail through ester linkages, said long-chain ester units having the formula:

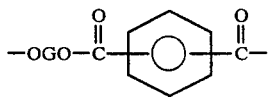
(a)

wherein G is a divalent radical remaining after removal of terminal hydroxyl groups from a glycol selected from poly(tetramethylene oxide) glycol having a molecular weight of about 600-2000, poly(ethylene oxide) glycol having a molecular weight of about 600-1500 and poly(propylene oxide) glycol having a molecular weight of about 1000-2500;

and said short-chain ester units having the formula:

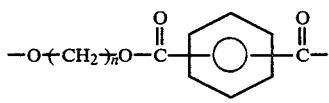
(b)

wherein n is 2-4, and with the proviso that the short-chain ester units constitute about 25-90 percent by weight and the long-chain ester units constitute about 75-10 percent by weight of the copolyether-ester.

12. The composition of claim 11 wherein

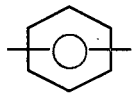

is at least one of terephthalate and isophthalate.

13. The composition of claim 12 wherein the glycol is poly(tetramethylene oxide) glycol and n is 4.

14. The composition of claim 13 wherein the short-chain ester units constitute about 45-65 percent by weight and the long-chain ester units constitute about 55-35 percent by weight of the copolyether-ester.

15. The composition of claim 14 wherein the oxymethylene polymer comprises about 20-40 percent by weight of the mixture and the copolyether-ester has an inherent viscosity of about 1.2-1.7.

16. The composition of claim 13 wherein the composition additionally contains about 0.5-5 percent by weight of an antioxidant selected from the group consisting of 4,4'-bis(α,α-dimethylbenzyl)diphenylamine, 1,3,5-tris(3,5-di-tert-butyl-4-hydroxyhydrocinnamoyl)-hexahydro-s-triazine and 1,6-bis[3-(3,5-di-tert-butyl-4-hydroxyphenyl)propionamido]hexane, and 0.5-3 percent by weight of a stabilizer selected from the group consisting of copolymers of polycaprolactam and polyhexamethylene adipamide, and terpolymers of polycaprolactam, polyhexamethylene adipamide and polyhexamethylene sebacamide.

17. The composition of claim 1 wherein the composition additionally contains about 0.5-5 percent by weight of an antioxidant selected from the group consisting of 4,4'-bis(α,α-dimethylbenzyl)diphenylamine, 1,3,5-tris(3,5-di-tert-butyl-4-hydroxyhydrocinnamoyl)hexahydro-s-triazine and 1,6-bis[3-(3,5-di-tert-butyl-4-hydroxyphenyl)propionamido]hexane, and 0.5-3 percent by weight of a stabilizer selected from the group consisting of copolymers of polycaprolactam and polyhexamethylene adipamide, and terpolymers of polycaprolactam, polyhexamethylene adipamide and polyhexamethylene sebacamide.

18. The composition of claim 17 containing less than 70 percent by weight of fillers selected from the group consisting of inorganic fillers and non-meltable polymeric fibers, based on the combined weight of molding composition and fillers.

19. The composition of claim 16 containing less than 70 percent by weight of fillers selected from the group consisting of inorganic fillers and non-meltable polymeric fibers, based on the combined weight of molding composition and fillers.

* * * * *